United States Patent
Kinlen (10) Patent No.: US 10,774,218 B2
(45) Date of Patent: Sep. 15, 2020

(54) IRON PARTICLE PASSIVATION

(71) Applicant: THE BOEING COMPANY, Chicago, IL (US)

(72) Inventor: Patrick J. Kinlen, Fenton, MO (US)

(73) Assignee: THE BOEING COMPANY, Chicago, IL (US)

( * ) Notice: Subject to any disclaimer, the term of this patent is extended or adjusted under 35 U.S.C. 154(b) by 354 days.

(21) Appl. No.: 15/803,561

(22) Filed: Nov. 3, 2017

(65) Prior Publication Data

US 2019/0136067 A1    May 9, 2019

(51) Int. Cl.
| | | |
|---|---|---|
| C09C 1/22 | (2006.01) | |
| H01F 1/26 | (2006.01) | |
| C23C 22/02 | (2006.01) | |
| B22F 1/00 | (2006.01) | |
| C23C 22/82 | (2006.01) | |

(Continued)

(52) U.S. Cl.
CPC .............. *C09C 1/22* (2013.01); *B22F 1/0062* (2013.01); *B22F 1/0088* (2013.01); *C09D 175/04* (2013.01); *C23C 22/02* (2013.01); *C23C 22/82* (2013.01); *H01F 1/0306* (2013.01); *H01F 1/26* (2013.01); *C01P 2006/42* (2013.01); *C08K 9/04* (2013.01); *C08K 2201/01* (2013.01)

(58) Field of Classification Search
CPC ...... B22F 1/0062; B22F 1/0088; C23C 22/02; C23C 22/82
See application file for complete search history.

(56) References Cited

U.S. PATENT DOCUMENTS

| | | |
|---|---|---|
| 2,783,208 A | 2/1957 | Katz |
| 5,472,661 A | 12/1995 | Gay |

(Continued)

FOREIGN PATENT DOCUMENTS

| | | |
|---|---|---|
| EP | 2184262 A1 | 5/2010 |
| JP | H0986915 A | 3/1997 |

OTHER PUBLICATIONS

G. Kataby, et al., Self-Assembled Monolayer Coatings on Amorphous Iron and Iron Oxide Nanoparticles: Thermal Stability and; Chemical Reactivity Studies, Langmuir, 1997, 13, pp. 6151-6158.

(Continued)

*Primary Examiner* — C Melissa Koslow
(74) *Attorney, Agent, or Firm* — Patterson + Sheridan, LLP (57) ABSTRACT

The present disclosure provides a coated iron particle, or reaction product thereof, comprising an iron particle and a thiol coating disposed on the iron particle. The present disclosure further provides compositions comprising a coated iron particle and a polymer or adhesion promoter. The present disclosure further provides components having a surface and a composition of the present disclosure disposed on the surface. Methods for passivating an iron particle can include introducing a passivation agent having one or more sulfur moieties into a solvent to form a passivation solution; and contacting an iron particle with the passivation solution to form a coated iron particle. Methods for passivating an iron particle can include introducing an iron particle into a solvent to form an iron particle solution; and contacting a passivation agent having one or more sulfur moieties with the iron particle solution to form a coated iron particle.

28 Claims, 7 Drawing Sheets

(51) Int. Cl.
*C09D 175/04* (2006.01)
*H01F 1/03* (2006.01)
*C08K 9/04* (2006.01)

(56) References Cited

U.S. PATENT DOCUMENTS

| | | | | |
|---|---|---|---|---|
| 5,989,447 | A * | 11/1999 | Podszun | H01F 1/447 |
| | | | | 252/62.52 |
| 6,645,286 | B2 * | 11/2003 | Ostertag | B22F 1/0007 |
| | | | | 106/403 |
| 2013/0112912 | A1 * | 5/2013 | Wolfrum | C09C 1/62 |
| | | | | 252/62.55 |
| 2013/0168612 | A1 | 7/2013 | Matzdorf et al. | |

OTHER PUBLICATIONS

M. Bloemen, et al., Improved functionalization of oleic acid-coated iron oxide; nanoparticles for biomedical applications, J Nanopart Res (2012) 14, 10 pp.

C. Yin, et al., Microwave Absorption and Antioxidation Properties of Flaky Carbonyl Iron Passivated with Carbon Dioxide, Journal of Magnetism and Magnetic Materials, 340 (2013), pp. 65-69.

Y. Zhou, et al., Electroless Plating Preparation and Electromagnetic Properties of Co-coated Carbonyl Iron Particles/polyimide Composite, Journal of Magnetism and Magnetic Materials, 401 (2016), pp. 251-258.

Q. Liu, et al., A Novel Two-Step Silica-Coating Process for Engineering Magnetic Nanocomposites, Chem. Mater. 1998, 10, pp. 3936-3940.

G. Walther, et al., Properties and Sintering Behaviour of Fine Spherical Iron Powders Produced by a New Hydrogen Reduction Process, Powder Metallurgy, 2014, 57, 12 pp.

P. Malecki, et al., Sol-gel Method as a Way of Carbonyl Iron Powder Surface Modification for Interaction Improvement, Journal of Solid State Chemistry, 226 (2015), pp. 224-230.

K. Sugimura, et al., Formation of High Electrical-resistivity Thin Surface Layer on Carbonyl-iron Powder (CIP) and Thermal Stability of Nanocrystalline Structure and Vortex Magnetic; Structure of CIP, AIP Advances 6, (2016), 9 pp.

K. Bloivie, Limits of Loose Metal Powder Density in the Sinterstation, Solid Freeform Fabrication Proceedings (Austin, Texas: University of Texas at Austin, 2001) pp. 264-275.

Extended European Search Report for Application No. 18200464.8-1108 dated Dec. 13, 2018.

* cited by examiner

IRON PARTICLE PASSIVATION

FIELD

Aspects of the present disclosure provide thiol coated iron particles, compositions including thiol coated iron particles, components with compositions disposed thereon, and methods for passivating iron particles.

BACKGROUND

In recent years, significant attention has been paid to magnetic particles, and iron particles in particular, which are commonly used because of their excellent magnetic properties. They can be applied in various fields of technologies, in biomedical applications, absorption and catalyst processes or to produce magnetorheological fluids and composites. Depending on desired dimensions, the iron particles can be nano-, micro- or macroscopic in size.

Carbonyl iron particles, for example, are primary components for the design of magnetic type electromagnetic wave absorbers. Carbonyl iron is substantially pure iron (99.9% iron content or greater) formed from iron containing carbonyl moieties (e.g., $Fe(CO)_5$). Carbonyl iron powder (CIP), for example, has specific magnetic properties useful for many applications and would be a desirable additive for a coating due to these magnetic properties. However, carbonyl iron is susceptibile to oxidation and corrosion at high temperatures leading to a decrease in magnetic properties. Furthermore, uniform dispersion of CIP is a challenge and failure to have proper dispersion can impact CIP performance. For example, methods, such as coating the particle with a polymer, can cause agglomeration of the particles and dispersion of the particles can be hindered.

Silica iron, for example, has been used instead of carbonyl iron because it is less susceptible to corrosion and easier to process. Known passivation techniques for carbonyl iron or silica iron include: carbon dioxide passivation, electroless plating of cobalt, polyaniline passivation, microwave plasma processes, as well as silica coatings. These processes involve numerous/complex processing steps, result in substantial increases in the mass and volume of the particle, cause agglomeration of the resulting particles, and can diminish the particles' magnetic properties.

There is a need for passivated iron particles with retained or improved magnetic properties and improved methods for passivating iron particles.

SUMMARY

The present disclosure provides coated iron particles, or reaction products thereof, comprising an iron particle and a thiol coating disposed on the iron particle.

Aspects of the present disclosure further provide compositions comprising a coated iron particle and a polymer or adhesion promoter.

Aspects of the present disclosure further provide components, such as components, such as vehicle components, having a surface and a composition of the present disclosure disposed on the surface.

Aspects of the present disclosure further provide methods for passivating an iron particle by introducing a passivation agent having one or more sulfur moieties into a solvent to form a passivation solution; and contacting an iron particle with the passivation solution to form a coated iron particle.

Aspects of the present disclosure further provide methods for passivating an iron particle by introducing an iron particle into a solvent to form an iron particle solution; and contacting a passivation agent having one or more sulfur moieties with the iron particle solution to form a coated iron particle.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

The present disclosure relates to coated iron particles and compositions that provide iron particles that are not prone to corrosion and maintain their magnetic properties after passivation. Methods of forming the coated iron particles of the present disclosure provide a simple (e.g., three step) process with relatively inexpensive materials, all of which reduce manufacturing time and costs, as compared to conventional iron coating methods.

Coated Iron Particles

The present disclosure provides iron particles having a thiol coating. A thiol coating can partially or completely coat the outer surface of an iron particle. An iron particle can be substantially pure iron. Iron particles can include carbonyl iron particles or silica iron particles. In at least one aspect, a coated iron particle has a diameter of from about 0.5 microns to about 1,000 microns, such as from about 1 micron to about 100 microns, such as from about 1 micron to about 20 microns, such as from about 1 micron to about 5 microns, such as from about 1 micron to about 3 microns, for example about 1.2 microns. It has been discovered that large particles (e.g., greater than 1,000 microns) are difficult to disperse due to their weight and are difficult to spray coat uniformly. Smaller particles are easier to disperse and easier to spray coat uniformly. An iron particle of the present disclosure can have an iron content of about 90 wt % or greater, such as about 95 wt % or greater, such as about 99 wt % or greater, such as about 99.9 wt % or greater. Iron particles can be obtained from commercial sources, such as BASF of Ludwigshafen, Germany.

In at least one aspect, a thiol coating is disposed on an iron particle and has a thickness of from about 30 Angstroms to about 15,000 Angstroms, such as from about 100 Angstroms to about 1,000 Angstroms, alternatively from about 10 Angstroms to about 1,000 Angstroms. In at least one aspect, a coated iron particle has a thiol coating content of from about 0.01 volume percent (vol %) to about 30 vol %, such as from about 0.05 vol % to about 10 vol %, such as from about 0.1 vol % to about 1 vol %, for example about 0.5 vol %, based on the total volume of the thiol coated iron particle, as determined by the difference in the weight and density of the particles before and after coating the particles. In at least one aspect, a coated iron particle has a thiol coating content of from about 0.5 weight percent (wt %) to about 30 wt %, such as from about 1 wt % to about 10 wt %, such as from about 2 wt % to about 5 wt %, for example about 3 wt %, based on the total weight of the thiol coated iron particle, as determined by the difference in the weight of the particles before and after coating the particles. As used herein, "thiol coating content" of an iron particle is the percent by volume or weight of a coated iron particle that is thiol coating.

Thiol coatings of the present disclosure have no or negligible effect on the magnetic susceptibility of an iron particle. In electromagnetism, the magnetic susceptibility (Latin: susceptibilis, "receptive"; denoted $\chi_s$) is one measure of the magnetic properties of a material. The susceptibility indicates whether a material is attracted into or repelled out of a magnetic field, which in turn can have implications for practical applications. As volume of the particle increases (for pure iron), $\chi_s$ increases. In a coating as the volume fraction increases, $\chi_s$ increases. So, if a core shell (core is iron and the shell is a passivating layer), $\chi_s$ would decrease as the shell gets thicker. Also, if the particle corrodes, the core decreases in size and $\chi_s$ will decrease. Thiol coatings of the present disclosure prevent or reduce corrosion of the iron particle.

In at least one aspect, a coated iron particle of the present disclosure has a diameter of from about 1 micron to about 5 microns and has a magnetic susceptibility of from about 3 $\chi_s$ to about 10 $\chi_s$. In at least one aspect, a coated iron particle of the present disclosure has a ratio of $\chi_s$ to particle diameter of from about 0.5:1 to about 1.5:1, such as about 0.7:1 to about 1.2:1, for example about 1:1. The ratio of $\chi_s$ to particle diameter illustrates that thiol coatings of the present disclosure can provide no or negligible effects on magnetic susceptibility of an iron particle, which provides maintained dispersion ability of the coated particles. Coated iron particles and compositions of the present disclosure disperse equally well (e.g., do not agglomerate) as compared to nonpassivated iron particles, unlike conventional coated iron particles, such as silica coated iron particles.

A thiol coating provides corrosion resistance of the iron particle in addition to promoting dispersion of the coated particles when in composition with other iron particles, such as other coated iron particles. Furthermore, thiol coatings of the present disclosure are thick enough to provide adequate protection of the iron particles from corrosion, but are thin enough that the iron particle's magnetic properties are not substantially diminished, if at all. Thiol coatings of the present disclosure can be self-assembled passivation monolayers on the iron particle surface. Without being bound by theory, thiol compound(s) of the thiol coating can covalently bond to the iron particle surface.

Thiol coatings of the present disclosure can include and/or are the reaction product of one or more thiol compounds. In at least one aspect, a thiol compound is selected from a heterocyclic thiol, a disulfide compound, a thiolate compound, and an alkyl polythiol.

A thiol compound of the present disclosure can be an organic compound that includes a disulfide group and/or a thiolate group (e.g., a metal-sulfide bond). A thiol compound can be an alkyl polythiol, such as a dithiol, trithiol, or tetrathiol. As compared to monothiols, polythiols can provide additional thiol moieties capable of interacting/covalently bonding to iron particles, which provides thiol coatings disposed on the iron particles that can have a reduced thickness, increased overall bond strength to the iron particles, and maintained/improved magnetic properties of the coated iron particles. Dithiols can include ethane dithiol, propane dithiol, butane dithiol, pentane dithiol, hexane dithiol, octane dithiol, nonane dithiol, and decane dithiol. Trithiols can include ethane trithiol, propane trithiol, butane trithiol, pentane trithiol, hexane trithiol, octane trithiol, nonane trithiol, and decane trithiol. Tetrathiols can include ethane tetrathiol, propane tetrathiol, butane tetrathiol, pentane tetrathiol, hexane tetrathiol, octane tetrathiol, nonane tetrathiol, and decane tetrathiol.

In at least one aspect, a thiol compound is represented by the formula: $R^1—S_n—X—R^2$, wherein $R^1$ is an organic group, n is an integer greater than or equal to 1, X is a sulfur or a metal atom, and $R^2$ is an organic group. One or both of $R^1$ and $R^2$ can include additional polysulfide groups and/or thiol groups. Furthermore, in at least one aspect, thiol compounds include polymers having the formula $—(R^1—S_n—X—R^2)_q—$, wherein $R^1$ is an organic group, n is a positive integer, X is a sulfur or a metal atom, $R^2$ is an organic group, and q is a positive integer. In at least one aspect, $R^1$ and $R^2$ (of a polymeric or monomeric corrosion inhibitor) is independently selected from H, alkyl, cycloalkyl, aryl, thiol, polysulfide, or thione. Each of $R^1$ and $R^2$ can be independently substituted with a moiety selected from alkyl, amino, phosphorous-containing, ether, alkoxy, hydroxy, sulfur-containing, selenium, or tellurium. In at least one aspect, each of $R^1$ and $R^2$ has 1-24 carbon atoms and/or non-hydrogen atoms. For example, heterocyclic examples of $R^1$ and $R^2$ groups include an azole, a triazole, a thiazole, a dithiazole, and/or a thiadiazole.

In at least one aspect, a thiol compound includes a metal in a metal-thiolate complex. Thiol compounds can include a metal center and one or more thiol groups (ligands) bonded and/or coordinated with the metal center with a metal-sulfide bond. A thiolate is a derivative of a thiol in which a metal atom replaces the hydrogen bonded to sulfur. Thiolates have the general formula M-S—$R^1$, wherein M is a metal and $R^1$ is an organic group. $R^1$ can include a disulfide group. Metal-thiolate complexes have the general formula M-(S—$R^1$)$_n$, wherein n generally is an integer from 2 to 9 and M is a metal atom. Metals are copper, zinc, zirconium, aluminum, iron, cadmium, lead, mercury, silver, platinum, palladium, gold, and/or cobalt.

In at least one aspect, the thiol compound includes an azole. Examples of suitable azoles include cyclic compounds having 1 nitrogen atom, such as pyrroles, 2 or more nitrogen atoms, such as pyrazoles, imidazoles, triazoles, tetrazoles and pentazoles, 1 nitrogen atom and 1 oxygen atom, such as oxazoles and isoxazoles, and 1 nitrogen atom and 1 sulfur atom, such as thiazoles and isothiazoles. Non-limiting examples of suitable azole-containing thiol compounds include 2,5-dimercapto-1,3,4-thiadiazole, 1H-benzotriazole, 1H-1,2,3-triazole, 2-amino-5-mercapto-1,3,4-thiadiazole, also named 5-amino-1,3,4-thiadiazole-2-thiol, 2-amino-1,3,4-thiadiazole. In at least one aspect, for example, the azole may be 2,5-dimercapto-1,3,4-thiadiazole. In some embodiments, the azole-containing thiol compound includes benzotriazole and/or 2,5-dimercapto-1,3,4-thiadiazole.

Thiol compounds of the present disclosure include heterocyclic thiol and amines, which can provide elimination of oxygen reduction. Heterocyclic thiols include thiadiazoles having one or more thiol moieties. Non-limiting examples of thiadiazoles having one or more thiol moieties include 1,3,4-thiadiazole-2,5-dithiol and thiadiazoles represented by formula (I) or formula (II):

The thiadiazole of formula (I) may be purchased from Vanderbilt Chemicals, LLC (of Norwalk, Conn.) and is known as Vanlube® 829. The thiadiazole of formula (II) may be purchased from WPC Technologies, Inc.™ (of Oak Creek, Wis.) and is known as InhibiCor™ 1000.

A thiol compound of the present disclosure can be a derivative of 2,5-dimercapto-1,3,4 thiadiazole represented by HS—$CN_2SC$—SH or "DMTD", and of selected derivatives of trithiocyanuric acid ("TMT") which can be used for application as a corrosion inhibitor in connection with a paint. Examples include 2,5-dimercapto-1,3,4 thiadiazole (DMTD), and 2,4-dimercapto-s-triazolo-[4,3-b]-1,3-4-thiadiazole, and trithiocyanuric acid (TMT). Other examples include N-,S- and N,N-, S,S- and N,S-substituted derivatives of DMTD such as 5-mercapto-3-phenil-1,3,4-thiadiazoline-2-thione or bismuthiol II (3-Phenyl-1,3,4-thiadiazolidine-2, 5-dithione) and various S-substituted derivatives of trithiocyanuric acid. Other examples include 5,5' dithio-bis (1,3,4 thiadiazole-2(3H)-thione or (DMTD)$_2$, or (DMTD), a polymer of DMTD; 5,5' thio-bis (1,3,4 thiadiazole-2(3H)-thione; or (TMT)$_2$, the dimer and polymers of TMT. Other examples include salts of DMTD of the general formula: M(DMTD)$_n$, where n=1, 2 or 3, and M is a metal cation such as M=Zn(II), Bi(III), Co(II), Ni(II), Cd(II), Pb(II), Ag(I), Sb(III), Sn(II), Fe(II), or Cu(II) (examples: ZnDMTD, Zn(DMTD)$_2$, Bi(DMTD)$_3$); similar salts of TMT, as for example, ZnTMT, in a ratio of 1:1; and, also, the comparable soluble Li(I), Ca(II), Sr(II), Mg(II), La(III), Ce(III), Pr(III), or Zr(IV) salts. Additional examples include salts of (DMTD)$_n$ of general formula M[(DMTD)$_n$]$_m$, where n=2 or n>2, m=1, 2, or 3 and M is a metal cation such as M=Zn(II), Bi(III), Co(II), Ni(II), Cd(II), Pb(II), Ag(I), Sb(III), Sn(II), Fe(II), or Cu(II). Typical examples are: Zn[(DMTD)$_2$], Zn[(DMTD)$_2$]$_2$.

Additional examples include ammonium-, aryl-, or alkyl-ammonium salts of DMTD, (DMTD)$_n$, or 5,5' thio-bis (1,3,4 thiadiazole-2(3H)-thione or 2,4-dimercapto-s-triazolo-[4,3-b]-1,3-4-thiadiazole. Typical examples include: Cyclohexyl amine: DMTD, in ratios of 1:1 and 2:1; Di-cyclohexyl amine: DMTD, in ratios of 1:1 and 2:1; Aniline: DMTD, in ratios of 1:1 and 2:1; similar salts of TMT, such as Di-cyclohexyl amine: TMT, in a ratio of 1:1. Additional examples include poly-ammonium salts of DMTD or (DMTD)$_n$ and TMT formed with polyamines.

Additional examples include inherently conductive polyaniline doped with DMTD or (DMTD)$_2$ or 5,5' thio-bis (1,3,4 thiadiazole-2(3H)-thione and TMT; Inherently conductive polypyrrole and/or polythiophene doped with DMTD, (DMTD)$_2$ and 5,5' thio-bis (1,3,4 thiadiazole-2(3H)-thione and/or TMT.

Additional examples include micro or nano composites of poly DMTD/polyaniline, poly DMTD/polypyrrole, and poly DMTD/polythiophene; similar micro or nano composites with TMT; and with 5,5' thio-bis (1,3,4 thiadiazole-2(3H)-thione; DMTD or salts of DMTD or derivatives of DMTD and of TMT, as organic constituents of various pigment grade inorganic matrixes or physical mixtures. In some aspects, such inorganic matrixes include anionic and cationic species with corrosion inhibitor properties, such as: $MoO_4^-$, $PO_4^-$, $HPO_3^-$, poly-phosphates, $BO_2^-$, $SiO_4^-$, $NCN^-$, $WO_4^-$, phosphomolybdate, phosphotungstate and respectively, Mg, Ca, Sr, La, Ce, Zn, Fe, Al, Bi.

Pigment grade forms of DMTD include Zn(DMTD)$_2$ and Zn-DMTD (among other organic and inorganic salts of the former) with inorganic products or corrosion inhibitor pigments, include: phosphates, molybdates, borates, silicates, tungstates, phosphotungstates, phosphomolybdates, cyanamides or carbonates of the previously specified cationic species, as well as oxides. Examples include: zinc phosphate, cerium molybdate, calcium silicate, strontium borate, zinc cyanamide, cerium phosphotungstate, ZnO, $CeO_2$, $ZrO_2$, and amorphous $SiO_2$.

Compositions and Coated Components

Thiol coated iron particles of the present disclosure can be present in a composition. In at least one aspect, compositions of the present disclosure include a thiol coated iron particle and one or more polymers or an adhesion promoter. In at least one aspect, a polymer includes at least one of a thermosetting polymer or a thermoplastic polymer. In at least one aspect, a polymer is at least one of an epoxy, a bismaleimide, a polyimide, a polyaryletherketone (such as a polyetheretherketone or a polyetherketone), a sol-gel, a polyurethane, a sealant, or a magneto rheological particle fluid. An adhesion promoter can be a sol-gel. A sol-gel can be Boegel®, such as 3M Surface Pre-Treatment AC-131 CB. 3% AC-131 kit can be obtained from 3M Corporation. 3% AC-131 is a non-chromate conversion coating and is typically disposed on aluminum, nickel, stainless steel, magnesium, and titanium alloys. AC-131 has a Part A, which is an aqueous mixture of glacial acetic acid (GAA) and zirconium tetra-n-propoxide (TPOZ) and a Part B, which is (3-glycidyloxypropyl)trimethoxysilane (GTMS). The two components are mixed together (Part A+Part B) and the molar ratio of silicon to zirconium in the mixture is 2.77:1. A molar ratio of acetic acid to TPOZ in Part A is 0.45:1. The measured volumes of GAA and TPOZ can be mixed vigorously for about 10 minutes and then added to the Part A from the AC-131 kit. The premixed Part A solution can then be added to a measured volume of the Part B solution from the AC-131 kit and stirred followed by a 30 minute induction period. Coated iron particles of the present disclosure can be added to the Part A/Part B mixture before, during, or after the induction period. The composition can then be disposed on a surface, such as a surface of a component, such as a vehicle component.

Sealants include silicones, polyurethanes and epoxies.

Magneto rheological particle fluids include particles dispersed in hydrocarbon oils, silicone oils, water phosphate ester fluids, synthetic oils.

Synthetic oils include: Group I: Conventional, non-synthetic oil. Made of fractionally distilled petroleum refined to improve certain performance categories like wax content and resistance to oxidation; Group II: Conventional, non-synthetic oil. Made of fractionally distilled petroleum that is further refined by hydrocracking (a hydrogen based treatment); Group III: Considered synthetic oil, but arguably has some significant similarities to conventional oil. Similar to Group II but with higher viscosity indices due to further hydrocracking refinement. Group IV: Synthetic oil. Comprised of polyalphaolefins (PAOs). Group V: This diverse group describes any base stocks that does not fit into any of the previous four groups.

Compositions of the present disclosure can have a coated iron particle content of from about 0.1 wt % to about 50 wt %, such as from about 0.5 wt % to about 10 wt %, such as from about 1 wt % to about 5 wt %, for example about 2 wt %. As used herein, "iron particle content" of a composition is the percent by weight of a composition that contains coated iron particles.

Compositions of the present disclosure can be disposed on a surface (such as a surface of a vehicle component). When disposed on a component, such as a vehicle component, a composition of the present disclosure provides a magnetic radar absorbing material capable of absorbing incident radio frequency radiation at a frequency of from about 30 MHz to about 300 Gz, such as about 300 MHz to about 30 GHz, such as about 3,000 MHz to about 3 GHz.

Compositions of the present disclosure can also be disposed on one or more surfaces of wind turbines, satellites, or other vehicles such as cars, boats, and the like.

Disposing a composition onto a surface can be performed by spraying, immersing, brushing, and/or wiping to form a composition layer. For example, suitable forms of spraying include spraying with a spray gun, high-volume, low-pressure spray gun, and/or hand pump sprayer. The solution is then cured (at room temperature or elevated temperature). In at least one aspect, a curing temperature is from about 10° C. to about 150° C., such as from about 20° C. to about 100° C., such as from about 30° C. to about 70° C., such as from about 40° C. to about 50° C. Curing can be performed for a time period of from about 15 minutes to about 72 hours. A cured composition layer of the present disclosure can have a thickness of from about 0.5 mil to about 500 mil, such as from about 5 mil to about 100 mil, such as from about 10 mil to about 50 mil.

A vehicle component is a component of a vehicle, such as a structural component, such as landing gear(s), a panel, or joint, of an aircraft. Examples of a vehicle component include an airfoil (such as a rotor blade), an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component.

Figure 1:
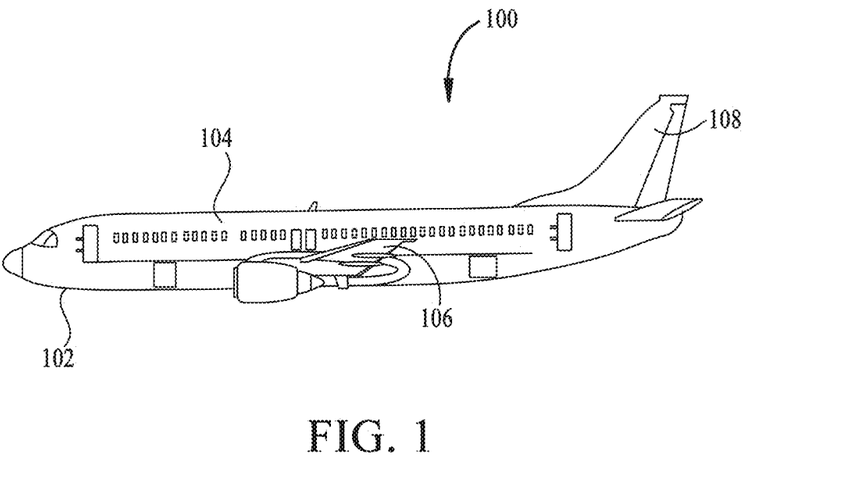
FIG. 1 is an aircraft comprising vehicle components, according to at least one aspect of the present disclosure.

FIG. 1 is an aircraft comprising vehicle components, according to at least one aspect of the present disclosure. As shown in FIG. 1, aircraft 100 includes an aircraft structure 102 including vehicle components such as an elongated body 104, a wing 106 extending laterally from the body 104, and a tail 108 extending longitudinally from the body 104. Compositions of the present disclosure can be disposed on one or more surfaces of these aircraft components to form one or more aircraft component(s) having a composition disposed thereon.

Other possible end uses of coated iron particles and/or compositions of the present disclosure can include incorporating the coated iron particles and/or composition into or onto magnetic tape (e.g., storage medium), motors (e.g., magnetic bearings), wind turbines (e.g., Doppler radar absorption to absorb the electromagnetic radiation), shielding for nuclear magnetic resonance spectroscopy machines (NMR) (e.g., magnetic coating), lining anechoic chambers (as a foam absorber), mu metal creating a change in magnetic field strength, and protecting computer chips from frequency exposure as an "RF blanket". Methods of the present disclosure can also include passivating copper particles (e.g., any small particles of metal that are susceptible to corrosion) for use in products, such as conductive inks.

Iron Particle Passivation

Figure 2:
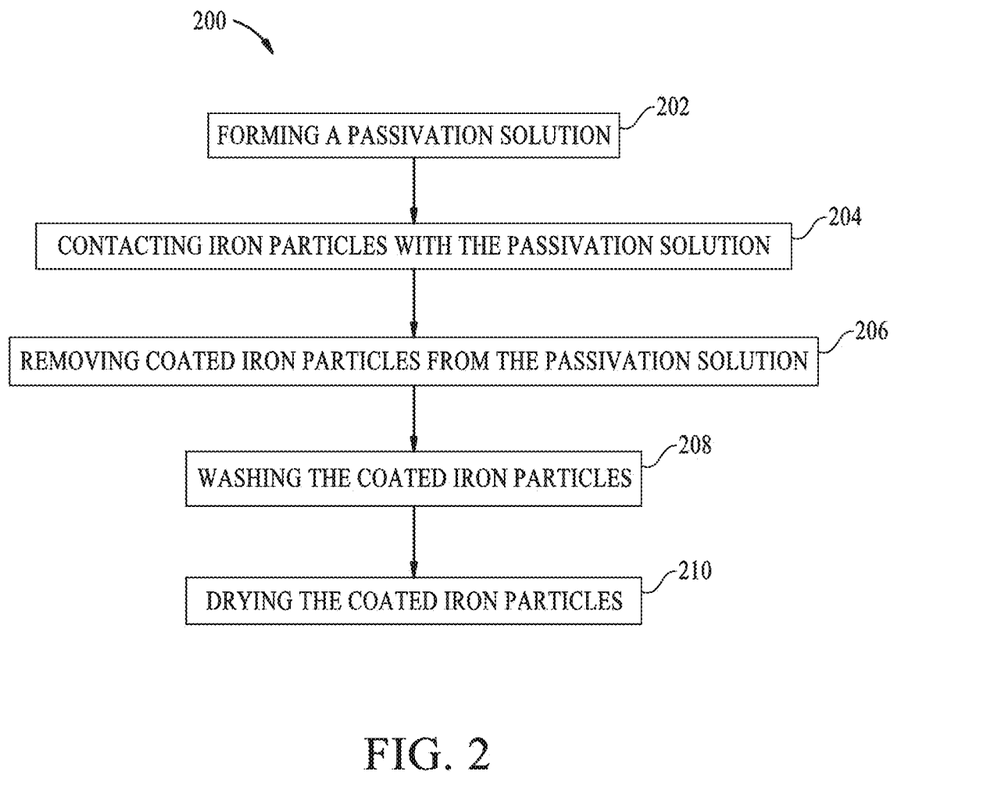
FIG. 2 is a flow diagram of a method for forming a thiol coated iron particle, according to at least one aspect of the present disclosure.

The present disclosure provides methods for forming a thiol coated iron particle by passivating the iron particle with a passivation agent. FIG. 2 is a method 200 for forming a thiol coated iron particle. Method 200 includes forming a passivation solution by dissolving or dispersing a passivation agent having one or more sulfur moieties in a solvent (Block 202).

Solvents can be aqueous or nonaqueous (e.g., organic). Preferably, a solvent is nonaqueous and contains little to no ammonium hydroxide. Nonaqeous solvents have been discovered to prevent the iron particles from caking when present in the passivation solution. In at least one aspect, an organic solvent is selected from alcohol, alkylcarbonates (e.g., dimethyl carbonate, diethyl carbonate, or dipropyl carbonate), ether (e.g., dimethyl ether or dipropylene glycol dimethyl ether), glycol ether, tetrahydrofuran (THF), N-methyl-2-pyrrolidone (NMP), dimethyl sulfoxide (DMSO), or mixtures thereof. In at least one aspect, an alcohol solvent is one or more of ethanol, n-propanol, isopropanol, n-butanol, isobutanol, sec-butanol, and an amyl alcohol (such as n-pentanol, isopentanol, and sec-pentanol). Nonaqueous solvents can be deaerated to remove air and moisture from the solvent by (1) introducing 3 Å or 4 Å molecular sieves to the solvent and heating the solvent and/or (2) by bubbling inert gas (such as nitrogen or argon) through the solvent for a period of time of from about 10 minutes to about 24 hours.

In at least one aspect, a concentration (moles per liter) of passivation agent in the passivation solution is from about 0.01 moles per liter (M) to about 10 M, such as from about 0.5 M to about 5 M, such as from about 1 M to about 2 M.

In at least one aspect, a passivation agent is a thiol compound. In at least one aspect, a passivation agent is selected from a heterocyclic thiol, a disulfide compound, a thiolate compound, and an alkyl polythiol.

A thiol compound of the present disclosure can be an organic compound that includes a disulfide group and/or a thiolate group (e.g., a metal-sulfide bond). A thiol compound can be an alkyl polythiol, such as a dithiol, trithiol, or tetrathiol. Dithiols can include ethane dithiol, propane dithiol, butane dithiol, pentane dithiol, hexane dithiol, octane dithiol, nonane dithiol, and decane dithiol. Trithiols can include ethane trithiol, propane trithiol, butane trithiol, pentane trithiol, hexane trithiol, octane trithiol, nonane trithiol, and decane trithiol. Tetrathiols can include ethane tetrathiol, propane tetrathiol, butane tetrathiol, pentane tetrathiol, hexane tetrathiol, octane tetrathiol, nonane tetrathiol, and decane tetrathiol.

In at least one aspect, a thiol compound is represented by the formula: $R^1$—$S_n$—X—$R^2$, wherein $R^1$ is an organic group, n is an integer greater than or equal to 1, X is a sulfur or a metal atom, and $R^2$ is an organic group. One or both of $R^1$ and $R^2$ can include additional polysulfide groups and/or thiol groups. Furthermore, in at least one aspect, thiol compounds include polymers having the formula —($R^1$—$S_n$—X—$R^2$)$_q$—, wherein $R^1$ is an organic group, n is a positive integer, X is a sulfur or a metal atom, $R^2$ is an organic group, and q is a positive integer. In at least one aspect, $R^1$ and $R^2$ (of a polymeric or monomeric corrosion inhibitor) is independently selected from H, alkyl, cycloalkyl, aryl, thiol, polysulfide, or thione. Each of $R^1$ and $R^2$ can be independently substituted with a moiety selected from alkyl, amino, phosphorous-containing, ether, alkoxy, hydroxy, sulfur-containing, selenium, or tellurium. In at least one aspect, each of $R^1$ and $R^2$ has 1-24 carbon atoms and/or non-hydrogen atoms. For example, heterocyclic examples of $R^1$ and $R^2$ groups include an azole, a triazole, a thiazole, a dithiazole, and/or a thiadiazole.

In at least one aspect, a thiol compound includes a metal in a metal-thiolate complex. Thiol compounds can include a metal center and one or more thiol groups (ligands) bonded and/or coordinated with the metal center with a metal-sulfide bond. A thiolate is a derivative of a thiol in which a metal atom replaces the hydrogen bonded to sulfur. Thiolates have the general formula M-S—$R^1$, wherein M is a metal and $R^1$ is an organic group. $R^1$ can include a disulfide group. Metal-thiolate complexes have the general formula M-(S—$R^1$)$_n$, wherein n generally is an integer from 2 to 9 and M is a metal atom. Metals are copper, zinc, zirconium, aluminum, iron, cadmium, lead, mercury, silver, platinum, palladium, gold, and/or cobalt.

In at least one aspect, the thiol compound includes an azole. Examples of suitable azoles include cyclic compounds having 1 nitrogen atom, such as pyrroles, 2 or more nitrogen atoms, such as pyrazoles, imidazoles, triazoles, tetrazoles and pentazoles, 1 nitrogen atom and 1 oxygen atom, such as oxazoles and isoxazoles, and 1 nitrogen atom and 1 sulfur atom, such as thiazoles and isothiazoles. Non-limiting examples of suitable azole-containing thiol compounds include 2,5-dimercapto-1,3,4-thiadiazole, 1H-benzotriazole, 1H-1,2,3-triazole, 2-amino-5-mercapto-1,3,4-thiadiazole, also named 5-amino-1,3,4-thiadiazole-2-thiol, 2-amino-1,3,4-thiadiazole. In at least one aspect, for example, the azole may be 2,5-dimercapto-1,3,4-thiadiazole. In some embodiments, the azole-containing thiol compound includes benzotriazole and/or 2,5-dimercapto-1,3,4-thiadiazole.

Thiol compounds of the present disclosure include heterocyclic thiol and amines, which can provide elimination of oxygen reduction. Heterocyclic thiols include thiadiazoles having one or more thiol moieties. Non-limiting examples of thiadiazoles having one or more thiol moieties include 1,3,4-thiadiazole-2,5-dithiol and thiadiazoles represented by formula (I) or formula (II):

The thiadiazole of formula (I) may be purchased from Vanderbilt Chemicals, LLC (of Norwalk, Conn.) and is known as Vanlube® 829. The thiadiazole of formula (II) may be purchased from WPC Technologies, Inc.™ (of Oak Creek, Wis.) and is known as InhibiCor™ 1000.

A thiol compound of the present disclosure can be a derivative of 2,5-dimercapto-1,3,4 thiadiazole represented by HS—$CN_2SC$—SH or "DMTD", and of selected derivatives of trithiocyanuric acid ("TMT") which can be used for application as a corrosion inhibitor in connection with a paint. Examples include 2,5-dimercapto-1,3,4 thiadiazole (DMTD), and 2,4-dimercapto-s-triazolo-[4,3-b]-1,3-4-thiadiazole, and trithiocyanuric acid (TMT). Other examples include N-,S- and N,N-, S,S- and N,S-substituted derivatives of DMTD such as 5-mercapto-3-phenil-1,3,4-thiadiazoline-2-thione or bismuthiol II (3-Phenyl-1,3,4-thiadiazolidine-2,5-dithione) and various S-substituted derivatives of trithiocyanuric acid. Other examples include 5,5' dithio-bis (1,3,4 thiadiazole-2(3H)-thione or (DMTD)$_2$, or (DMTD), a polymer of DMTD; 5,5' thio-bis (1,3,4 thiadiazole-2(3H)-thione; or (TMT)$_2$, the dimer and polymers of TMT. Other examples include salts of DMTD of the general formula: M(DMTD)$_n$, where n=1, 2 or 3, and M is a metal cation such as M=Zn(II), Bi(III), Co(II), Ni(II), Cd(II), Pb(II), Ag(I), Sb(III), Sn(II), Fe(II), or Cu(II) (examples: ZnDMTD, Zn(DMTD)$_2$, Bi(DMTD)$_3$); similar salts of TMT, as for example, ZnTMT, in a ratio of 1:1; and, also, the comparable soluble Li(I), Ca(II), Sr(II), Mg(II), La(III), Ce(III), Pr(III), or Zr(IV) salts. Additional examples include salts of (DMTD)$_n$ of general formula M[(DMTD)$_n$]$_m$, where n=2 or n>2, m=1, 2, or 3 and M is a metal cation such as M=Zn(II), Bi(III), Co(II), Ni(II), Cd(II), Pb(II), Ag(I), Sb(III), Sn(II), Fe(II), or Cu(II). Typical examples are: Zn[(DMTD)$_2$], Zn[(DMTD)$_2$]$_2$.

Additional examples include ammonium-, aryl-, or alkyl-ammonium salts of DMTD, (DMTD)$_n$, or 5,5' thio-bis (1,3,4 thiadiazole-2(3H)-thione or 2,4-dimercapto-s-triazolo-[4,3- b]-1,3-4-thiadiazole. Typical examples include: Cyclohexyl amine: DMTD, in ratios of 1:1 and 2:1; Di-cyclohexyl amine: DMTD, in ratios of 1:1 and 2:1; Aniline: DMTD, in ratios of 1:1 and 2:1; similar salts of TMT, such as Di-cyclohexyl amine: TMT, in a ratio of 1:1. Additional examples include poly-ammonium salts of DMTD or $(DMTD)_n$ and TMT formed with polyamines.

Additional examples include inherently conductive polyaniline doped with DMTD or $(DMTD)_2$ or 5,5' thio-bis (1,3,4 thiadiazole-2(3H)-thione and TMT; Inherently conductive polypyrrole and/or polythiophene doped with DMTD, $(DMTD)_2$ and 5,5' thio-bis (1,3,4 thiadiazole-2(3H)-thione and/or TMT.

Additional examples include micro or nano composites of poly DMTD/polyaniline, poly DMTD/polypyrrole, and poly DMTD/polythiophene; similar micro or nano composites with TMT; and with 5,5' thio-bis (1,3,4 thiadiazole-2(3H)-thione; DMTD or salts of DMTD or derivatives of DMTD and of TMT, as organic constituents of various pigment grade inorganic matrixes or physical mixtures. In some aspects, such inorganic matrixes include anionic and cationic species with corrosion inhibitor properties, such as: $MoO_4^-$, $PO_4^-$, $HPO_3^-$, poly-phosphates, $BO_2^-$, $SiO_4^-$, $NCN^-$, $WO_4^-$, phosphomolybdate, phosphotungstate and respectively, Mg, Ca, Sr, La, Ce, Zn, Fe, Al, Bi.

Additional examples include DMTD or salts of DMTD or derivatives of DMTD and TMT in encapsulated forms, such as: inclusions in various polymer matrices, or as cyclodextrin-inclusion compounds or in microencapsulated form.

Pigment grade forms of DMTD include $Zn(DMTD)_2$ and Zn-DMTD (among other organic and inorganic salts of the former) with inorganic products or corrosion inhibitor pigments, include: phosphates, molybdates, borates, silicates, tungstates, phosphotungstates, phosphomolybdates, cyanamides or carbonates of the previously specified cationic species, as well as oxides. Examples include: zinc phosphate, cerium molybdate, calcium silicate, strontium borate, zinc cyanamide, cerium phosphotungstate, ZnO, $CeO_2$, $ZrO_2$, and amorphous $SiO_2$.

Method 200 includes introducing iron particles (such as carbonyl iron powder) to the passivation solution (Block 204) to form iron particles fully or partially coated (e.g., encapsulated) in passivation agent. Alternatively, Block 204 can include introducing iron particles to the solvent to form an iron particle solution followed by introducing the passivation agent to the iron particle solution to form iron particles fully or partially coated (e.g., encapsulated) in passivation agent. Introducing (Block 204) can include gently mixing the iron particles in the passivation solution or iron particle solution with any suitable stirring device, such as a stir bar or stir propeller or Vortex stirrer. Stirring can be performed in a Roller Mixer to provide a gentle mixing environment. It has been discovered that overly aggressive mixing (or exposure to harsh chemicals in the solution such as acid solutions having a pH of about 3 or base solutions (e.g., ammonium hydroxide) having a pH of about 11) can oxidize the iron particle, reducing the magnetic properties of the iron particle. For example, mixing iron particles with concentrated 2,5-dimercapto-1,3,4-thiadiazole (DMcT) in a Thinky Mixer can erode the iron particles. Furthermore, some thiol compounds can be considered acidic and/or basic. For example, DMcT is acidic and too long of an exposure time of the iron particle to a concentrated DMcT solution can erode the iron particle.

In at least one aspect, a weight ratio (g/g) of passivation agent to iron particle is from about 0.01:1 to about 1:0.01, such as from about 0.05:1 to about 0.5:1, such as from about 0.1:1 to about 0.4:1, for example about 0.11:1.

Before and/or during introducing the iron particles to the passivation solution, the passivation solution or iron particle solution can be heated. In at least one aspect, a method includes heating the passivation solution to a temperature of from about 20° C. to about 120° C., such as from about 40° C. to about 80° C., for example about 60° C. In at least one aspect, a method includes heating the iron particle solution to a temperature of from about 20° C. to about 120° C., such as from about 40° C. to about 80° C., for example about 60° C.

In at least one aspect, stirring/mixing is performed at a stir rate/vibration rate of from about 50 revolutions per minute (rpm) to about 5,000 rpm, such as from about 300 rpm to about 2,000 rpm. In at least one aspect, mixing is performed for a time period of from about 10 seconds to about 1 hour, such as from about 30 seconds to about 5 minutes.

Method 200 includes removing the coated iron particles from the passivation solution (Block 206). Removing can be performed using any suitable filtration setup, such as filter paper or wire gauze filter. In at least one aspect, a method includes filtering the coated iron particles. Filter paper or wire gauze can have an average pore size of 100 microns or less, such as from about 0.1 micron to about 50 microns, such as from about 3 microns to about 20 microns, for example about 11 microns (Grade 1). Added or reduced pressure (e.g., vacuum) can be applied to the filtration setup to promote filtration of the coated iron particles as the filtrand and solvent as the filtrate. Method 200 further includes washing the filtered coated particles with a solvent (Block 208). In at least one aspect, the solvent is one or more of an alcohol (e.g., isopropanol, ethanol, or methanol), an alkane (e.g., hexanes), or an alkylcarbonate (e.g., dimethyl carbonate, diethyl carbonate, or dipropyl carbonate).

Method 200 includes drying the coated iron particles (Block 210). Drying can be performed using a filter cloth, towel, and/or by pressurized air/inert gas. Inert gas includes nitrogen and/or argon. Drying can alternatively or additionally be performed by curing the coated iron particles at room temperature or elevated temperature. In at least one aspect, a method includes drying the coated iron particles by curing the particles at a temperature of from about 10° C. to about 150° C., such as from about 20° C. to about 100° C., such as from about 30° C. to about 70° C., such as from about 40° C. to about 50° C. Curing can be performed for a time period of from about 15 minutes to about 72 hours.

EXAMPLES

Example 1

Materials:
1. 2,5-dimercapto-1,3,4-thiadiazole (DMcT), molecular weight: 150.232 g/mol, from Acros.
2. Vanlube 829, 871 and 972 M were obtained from RT Vanderbilt.
3. Carbonyl iron powder (CIP) HQ was obtained from BASF.

Roller Mill Sample Preparation DMcT-CIP:
3 grams of DMcT was dissolved in 150.85 grams of deaerated isopropanol (density 0.786 g/cm³) to give a 2.0 wt. % or 0.104 M solution. Dispersions of CIP were prepared as described in Table 1 in small glass vials. All solutions were deaerated with nitrogen. The vials were mixed for three days using a roller mill.

TABLE 1

| Wt. CIP, g | Wt. 2% DMcT soln, g | Wt. IPA from DMct soln, g | Wt. IPA added, g | Total wt. IPA | Total Vol. IPA, ml |
|---|---|---|---|---|---|
| 1.267 | 9.67 | 9.4766 | 0 | 9.4766 | 12.05674 |
| 1.376 | 1.042 | 1.02116 | 7.9 | 8.92116 | 11.35008 |
| 1.085 | 0.113 | 0.11074 | 9.475 | 9.58574 | 12.1956 |
| 25.334 | 140.38 | 137.5724 | 0 | 137.5724 | 175.0285 |

| Wt. DMcT, g | [DMcT] | Wt. DMcT/Wt. CIP | |
|---|---|---|---|
| 0.1934 | 0.106774 | 0.152644 | |
| 0.02084 | 0.012222 | 0.015145 | |
| 0.00226 | 0.001234 | 0.002083 | |
| 2.8076 | 0.106774 | 0.110823 | |

After milling, the IPA was removed from the vials using a rotovap equipped with a special adapter to accommodate the vial. The above samples were evaluated for corrosion resistance to 5% NaCl pH 2.9 acetic acid. A piece of filter paper was placed in the bottom of a vial and a small sample of powdered was sprinkled on top of the filter paper. A few drops of the acidified NaCl solution was then applied to the top of the sample to saturate the paper. The vials were then sealed with a screw cap top and allowed to react for 24 hours. It was observed that the highest ratio of DMcT/CIP exhibited corrosion protection as compared to the other samples. Other examples and data using Thinky Orbital Mixer provided similar results.

Orbital Mixer Preparation of DMcT-CIP 25.33 grams of CIP was mixed with 140.38 grams of 0.1 M DMcT in IPA and mixed using a Thinky mixer. 11 to 15 gram samples were taken from the mixing vessel at various time intervals as shown in Table 2 and placed in sealed vials.

TABLE 2

| Sample | Time interveral, minutes | RPM | Dispersion weight, grams |
|---|---|---|---|
| 1 | 10 | 1100 | 13.018 |
| 2 | 20 | 1100 | 15.661 |
| 3 | 30 | 1100 | 12.951 |
| 4 | 59.5 | 1100 | 15.254 |
| 5 | 89.0 | 1100 | 11.370 |
| 6 | 89.0 | 1100 | ca 97 |

Samples were separated from the DMcT IPA solution by vacuum filtration through a 0.2 micron Teflon filter and washed with IPA. Samples were tested for corrosion resistance to pH 2.8 acetic acid in 5% NaCl and compared with controls by saturating a piece of filter paper with solution and sprinkling on the CIP powder. The samples were placed in a sealed container and visual corrosion, i.e. red rust formation, was compared between samples after 24 hours exposure.

Orbital Mixer Preparation of VL829-CIP 5.96 grams of Vanlube 829 (VL829), F.W.=298.48, was dispersed into 200 ml of 1 M ammonium hydroxide to give a 1.0 M solution. The solution was heated to boiling. After 10 minutes the solution turned color from dark yellow to a very light yellow. The solution was passed through a 1 micron vacuum filter to remove any undissolved material (which was very little, if any). 24.62 grams of CIP was added to the VL829 ammonium hydroxide solution and mixed in the Thinky at 1100 RPM, with samples being taken at 29.5 minute intervals as shown in Table 3. From Table 1, the weight ratio of DMcT to CIP is 0.11.

TABLE 3

| Sample (NB33) | Time Interval, Minutes |
|---|---|
| 1 | 29.5 |
| 2 | 59.0 |
| 3 | 88.5 |
| 4 | 118.0 |

The samples collected were allowed to settle, and the supernate decanted. The wet powder was then dried under vacuum at 60° C. overnight. Samples were tested for corrosion resistance to pH 2.8 acetic acid in 5% NaCl. Samples 1-3 exhibited some improvement in corrosion protection.

Sonication Method for Vanlube 871 and 972M

Vanlube 871 and 972M were also evaluated as coating formulations for CIP. Vanlube 972M is a thiadiazole derivative in polyalkylene glycol, while Vanlube 871 is a 2,5, dimercapto-1,3,4-thiadiazole alkylcarboxylate. In this case both materials were dispersed with the CIP and isopropanol and sonicated as described in Table 4.

TABLE 4

| Material | Wt. material, gm | Wt. CIP, gm | Wt. IPA, gm | Sonication |
|---|---|---|---|---|
| Vanlube 871 | 16.43 | 5.74 | 9.13 | 11 min, 30° C. |
| Vanlube 972M | 19.51 | 4.96 | 8.1 | 11 min, 30° C. |

The coated CIP's were recovered from solution, air dried and tested for corrosion resistance. VL972M exhibited better corrosion protection than VL871.

Orbital Mixer Preparation of IC 1000-CIP 7.2 grams of Inhibicor 1000 from Wayne Pigments was mixed into 200 ml 0.1 M ammonium hydroxide and boiled for 15 minutes. It was then placed on a roller mill and mixed over the weekend. After filtration, a white powder remained on the filter, while the filtrate was found to be yellow. 10 grams of CIP was mixed with 200 ml of the filtrate and mixed on the Thinky orbital mixture at 1100 RPM and samples taken at 29.5 minutes, 59 minutes and 88.5 minutes. The samples were filtered and rinsed with DI water and air dried. They were then evaluated for corrosion resistance. The results indicated sample 2 (the 59 minute sample) shows the best corrosion resistance. Upon further investigation, it appears that the yellow filtrate is most likely DMcT with the white powder being zinc oxide/hydroxide. In essence, this experiment most likely evaluated the effect of DMcT in ammonium hydroxide.

Example 1 Observations

1. DMcT-CIP was prepared using a roller mill and the orbital Thinky mill from a solution of DMcT in IPA.
2. DMcT-CIP at a weight ratio of 0.11 prepared using the orbital mixing method in IPA was shown to significantly improve the corrosion resistance of the CIP iron particles when exposed to acidified salt solution.
3. VL829-CIP exhibited marginal corrosion protection performance when prepared using the orbital mixing method in ammonium hydroxide.
4. Using IPA as a diluent, VL972M exhibited better performance than VL 871 when using the sonication method but somewhat less than DMcT.
5. The roller milling method has been shown to be a superior process to the Thinky method when coating particles with DMcT using IPA as the solvent.

Figure 3A:
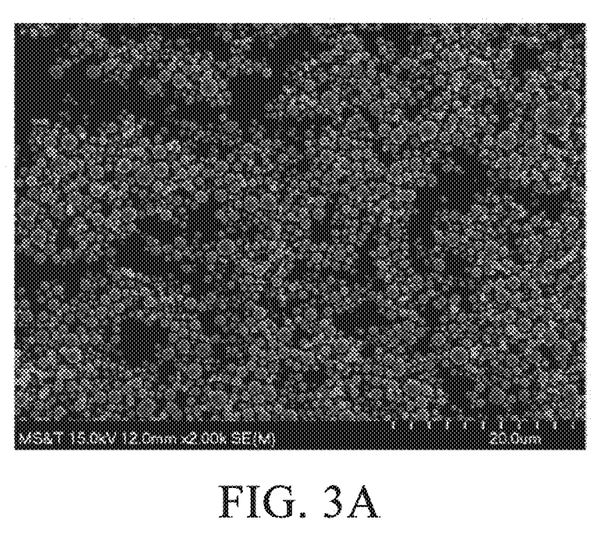
FIG. 3A is a scanning electron microscope image of carbonyl iron particles that have not undergone thiol passivation, according to at least one aspect of the present disclosure.
Figure 3B:
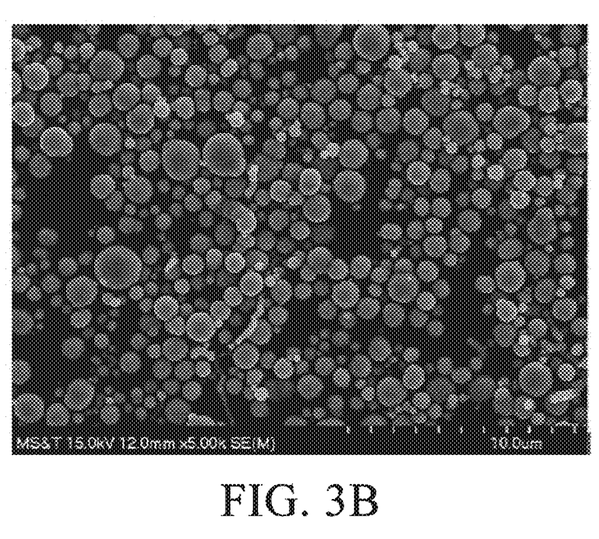
FIG. 3B is a scanning electron microscope image of carbonyl iron particles that have not undergone thiol passivation, according to at least one aspect of the present disclosure.
Figure 3C:
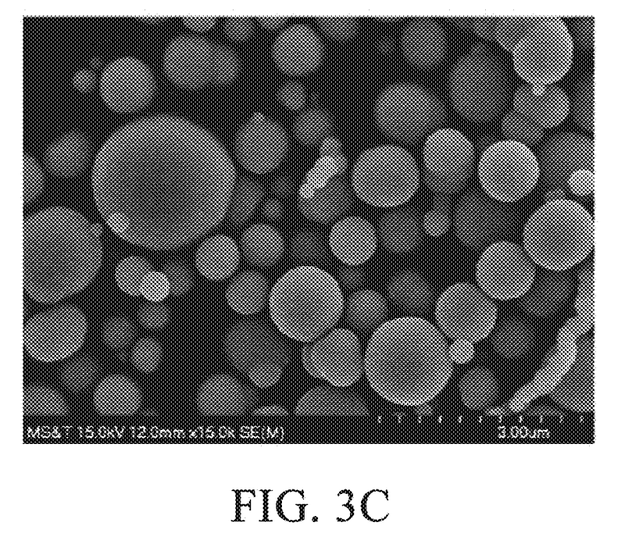
FIG. 3C is a scanning electron microscope image of carbonyl iron particles that have not undergone thiol passivation, according to at least one aspect of the present disclosure.
Figure 4A:
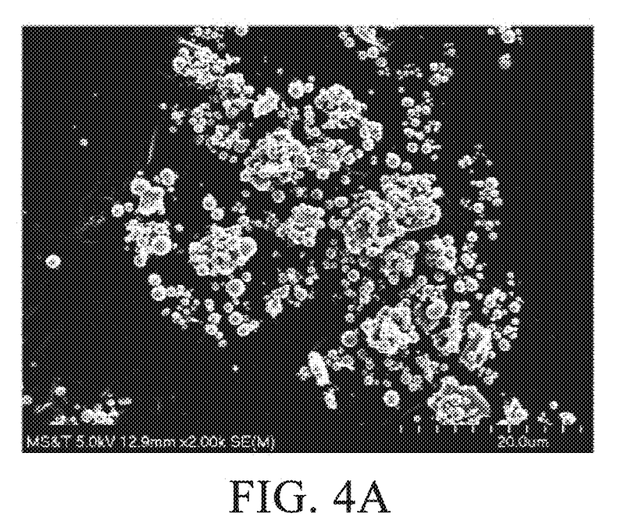
FIG. 4A is a scanning electron microscope image of carbonyl iron particles that have been passivated with 2,5-dimercapto-1,3,4-thiadiazole, according to at least one aspect of the present disclosure.
Figure 4B:
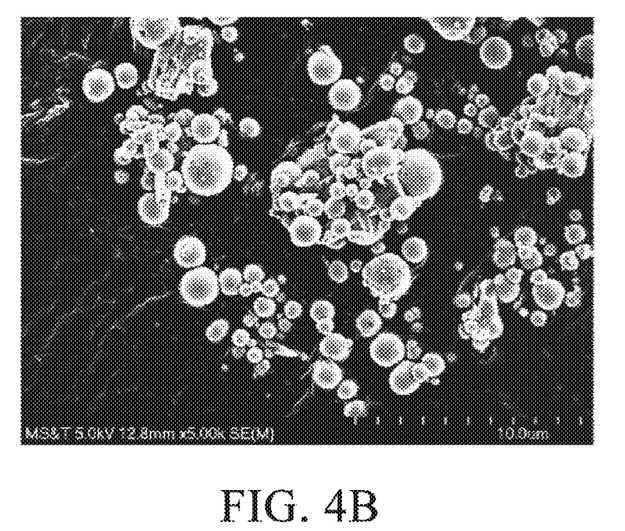
FIG. 4B is a scanning electron microscope image of carbonyl iron particles that have been passivated with 2,5-dimercapto-1,3,4-thiadiazole, according to at least one aspect of the present disclosure.
Figure 4C:
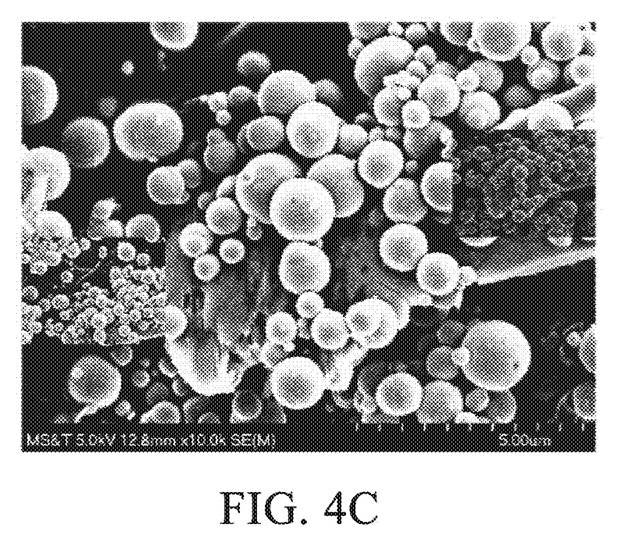
FIG. 4C is a scanning electron microscope image of carbonyl iron particles that have been passivated with 2,5-dimercapto-1,3,4-thiadiazole, according to at least one aspect of the present disclosure.

Furthermore, FIGS. 3A, 3B, and 3C are scanning electron microscope images of carbonyl iron particles that have not undergone thiol passivation. The particles are substantially spherical. FIGS. 4A, 4B, and 4C are scanning electron microscope images of carbonyl iron particles that have been passivated with DMcT. Many of the particles are rectangular in shape, while many others are spherical.

Figure 5A:
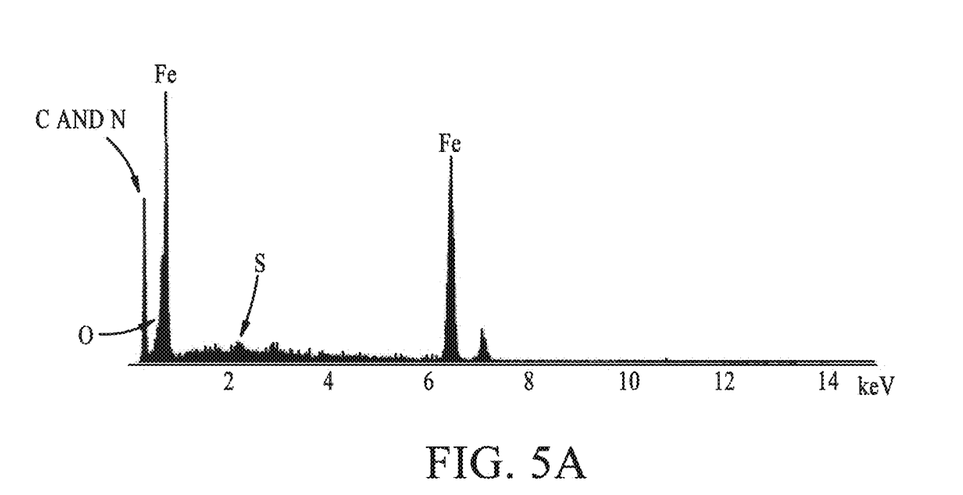
FIG. 5A is an Energy Dispersive Spectroscopy spectrum of the carbonyl iron particle SEM images of FIGS. 3A-3C, according to at least one aspect of the present disclosure.
Figure 5B:
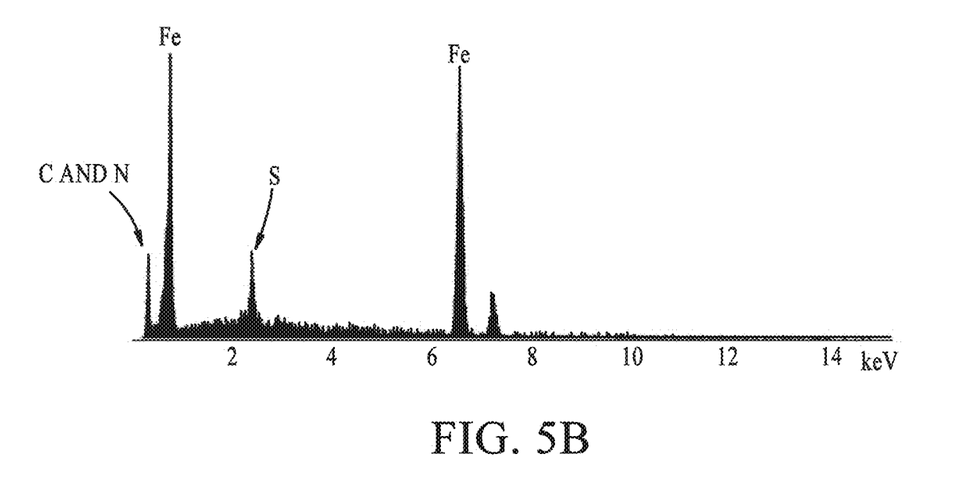
FIG. 5B is an Energy Dispersive Spectroscopy spectrum of the 2,5-dimercapto-1,3,4-thiadiazole passivated iron particle SEM images of FIGS. 4A-4C, according to at least one aspect of the present disclosure.

In addition, backscattered electron images in the SEM display compositional contrast that results from different atomic number elements and their distribution. Energy Dispersive Spectroscopy (EDS) allows one to identify what those particular elements are and their relative proportions (Atomic % for example). FIG. 5A is an EDS spectrum of the carbonyl iron particle SEM images of FIGS. 3A-3C. As shown in FIG. 5A, there is no sulfur content in these particles. FIG. 5B is an EDS spectrum of the DMcT passivated iron particle SEM images of FIGS. 4A-4C. As shown in FIG. 5B, the particles contain a substantial amount of sulfur content, indicative of a thiol passivation layer disposed thereon.

Example 2

Additional tests of the coated particles were performed under $SO_2$ fog (ASTM B117), which has a lower pH (3) and is considered a very aggressive test. No corrosion was observed and the particle puck exhibited magnetic susceptibility.

Example 3

Coated CIP particles have been formulated into a polyurethane coating. Tests have been run on this coating placed on polycarbonate panels in a standard salt fog cabinet for 500 hours. These panels do not show indicia of corrosion. This coating does not interfere with the magnetic properties of the iron particles. A control has been run, which has failed.

Example 3 Materials

1. Modified and un-modified CIP powder
2. PPG Polyurethane PR1664 Base (part B) and 73008-001 (part A); 10:1 weight Ratio
3. Dimethylcarbonate (DMC) solvent
4. 3x5 polycarbonate (PC) panels Example 3 Equipment 1. Thinky Mixer (Sequence Settings) 500 RPM for 30 seconds, 1,000 RPM for 30 s, 1,500 RPM for 30 seconds
2. Disposable 200 ml polypropylene cups Example 3 Procedure (for Modified and Un-Modified CIP)

1. Dissolved 50 grams of part B in 60 grams of DMC in a 200 ml disposable cup.
2. Added 50 grams of CIP to the above solution.
3. Ran Thinky per program above.
4. Added 5 grams of Part A to the mixed dispersion.
5. Ran Thinky per program above.
6. Transferred contents to sprayer bottle, diluted with DMC as needed to achieve a sprayable consistency.
7. Spray applied to 10 PC panels. The formulation was sprayed immediately after mixing.
8. The coated panels were air dried for 24 hours.

Example 3 Observations

Figure 6A:
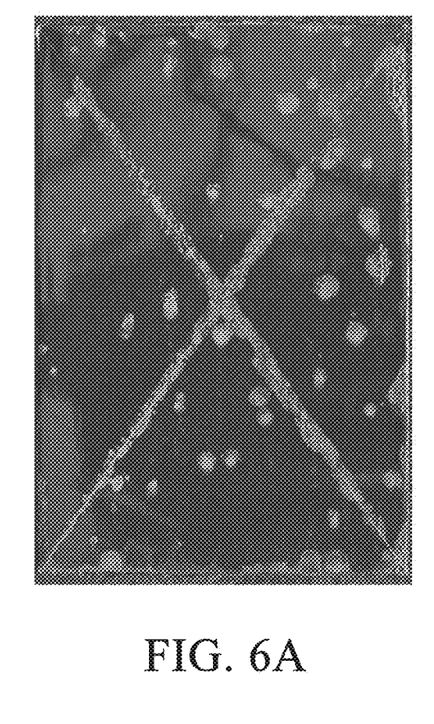
FIG. 6A is a photograph of a panel coated with a polyurethane coating having unmodified carbonyl iron particles.
Figure 6B:
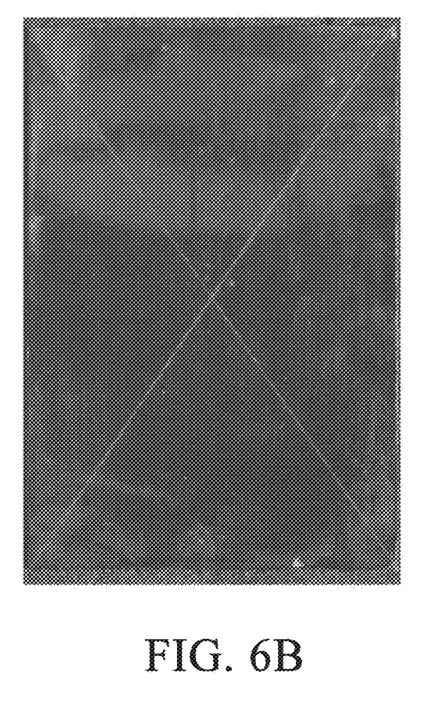
FIG. 6B is a photograph of a panel coated with a polyurethane coating having thiol coated iron particles.

FIG. 6A is a photograph of a panel coated with a polyurethane coating having unmodified carbonyl iron particles. The coated panel was exposed to a salt fog for 1,000 hours according to ASTM B117. As shown in FIG. 6A, substantial corrosion is observed. FIG. 6B is a photograph of a panel coated with a polyurethane coating having thiol coated iron particles. The coated panel was exposed to a salt fog for 1,000 hours according to ASTM B117. As shown in FIG. 6B, there is no observable corrosion of the panel.

Overall, coated iron particles and compositions of the present disclosure provide iron particles that are not prone to corrosion and maintain their magnetic properties after passivation. Furthermore, coated iron particles and compositions of the present disclosure disperse equally well (e.g., do not agglomerate) as compared to nonpassivated iron particles, unlike conventional coated iron particles. Methods of forming the coated iron particles of the present disclosure provide a simple (e.g., three step) process with relatively inexpensive materials, all of which reduce manufacturing time and costs, as compared to conventional iron coating methods.

DEFINITIONS

The term "alkyl" includes a substituted or unsubstituted, linear or branched acyclic alkyl radical containing from 1 to about 20 carbon atoms. In at least one aspect, alkyl includes linear or branched $C_{1-20}$ alkyl. $C_{1-20}$ alkyl includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosanyl, and structural isomers thereof.

The term "cycloalkyl" includes a substituted or unsubstituted, cyclic alkyl radical containing from 1 to about 20 carbon atoms.

The term "aryl" refers to any monocyclic, bicyclic or tricyclic carbon ring of up to 6 atoms in each ring, wherein at least one ring is aromatic, or an aromatic ring system of 5 to 14 carbons atoms which includes a carbocyclic aromatic group fused with a 5- or 6-membered cycloalkyl group. Examples of aryl groups include, but are not limited to, phenyl, naphthyl, anthracenyl, or pyrenyl.

The term "alkoxy" is RO— wherein R is alkyl as defined herein. The terms alkyloxy, alkoxyl, and alkoxy may be used interchangeably. Examples of alkoxy include, but are not limited to, methoxyl, ethoxyl, propoxyl, butoxyl, pentoxyl, hexyloxyl, heptyloxyl, octyloxyl, nonyloxyl, decyloxyl, and structural isomers thereof.

The term "ether" is an oxygen atom bridging two carbon atoms.

The term "thione" refers to a moiety represented by the structure —$CR_2$—(C=S)—$CR_2$—, where each R is independently hydrogen, alkyl, acyl, heteroalkyl, aryl, cycloalkyl, heteroaryl, or heterocycloalkyl.

The term "heterocyclyl" refers to a monocyclic, bicyclic or tricyclic ring having up to 10 atoms in each ring, wherein at least one ring is aromatic and contains from 1 to 4 heteroatoms in the ring selected from N, O and S. Non-limiting examples of heterocyclyl include pyridyl, thienyl, furanyl, pyrimidyl, imidazolyl, pyranyl, pyrazolyl, thiazolyl, thiadiazolyl, isothiazolyl, oxazolyl, isoxazoyl, pyrrolyl, pyridazinyl, pyrazinyl, quinolinyl, isoquinolinyl, benzofuranyl, dibenzofuranyl, dibenzothiophenyl, benzothienyl, indolyl, benzothiazolyl, benzooxazolyl, benzimidazolyl, isoindolyl, benzotriazolyl, purinyl, thianaphthenyl, pyrazinyl, azole, triazole, thiazole, dithiazole, and thiadiazole. Attachment of heterocyclyl can occur via an aromatic ring or through a non-aromatic ring or a ring containing no heteroatoms.

The term "amino" refers to a primary, secondary or tertiary amine-containing radical. An example of an amino radical is —$NH_2$. An amino radical may be substituted with $R^4$ or $R^5$ where $R^4$ may be, for example, cyano, haloacyl, alkenylcarbonyl, hydroxyalkenylcarbonyl, am inoalkenylcarbonyl, monoalkylaminoalkenylcarbonyl, dialkylaminoalkenylcarbonyl, haloalkenylcarbonyl, cyanoalkenylcarbonyl, alkoxycarbonylalkenylcarbonyl, alkynylcarbonyl, hydroxyalkynylcarbonyl, alkylcarbonylalkenylcarbonyl, cycloalkylcarbonylalkenylcarbonyl, arylcarbonylalkenylcarbonyl, aminocarbonylalkenylcarbonyl, monoalkylaminocarbonylalkenylcarbonyl, dialkylaminocarbonylalkenylcarbonyl or alkenylsulfonyl; and $R^5$ may be, for example, H, alkyl or cycloalkyl.

Compounds of the present disclosure include tautomeric, geometric or stereoisomeric forms of the compounds. Ester, oxime, onium, hydrate, solvate and N-oxide forms of a compound are also embraced by the present disclosure. The present disclosure considers all such compounds, including cis- and trans-geometric isomers (Z- and E-geometric isomers), R- and S-enantiomers, diastereomers, d-isomers, l-isomers, atropisomers, epimers, conformers, rotamers, mixtures of isomers and racemates thereof are embraced by the present disclosure.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein. While the foregoing is directed to aspects of the present disclosure, other and further aspects of the present disclosure may be devised without departing from the basic scope thereof.

What is claimed is:

1. A coated iron particle, or reaction product thereof, comprising:
    an iron particle having a diameter of from about 0.5 micron to about 1,000 microns; and
    a thiol coating disposed on the iron particle, wherein:
    the thiol coating has a thickness of from about 10 Angstroms to about 1,000 Angstroms.
2. The coated iron particle of claim 1, wherein the iron particle has a diameter of from about 1 micron to about 1,000 microns.

3. The coated iron particle of claim 2, wherein the iron particle has an iron content of about 99 wt % or greater.
4. The coated iron particle of claim 1, wherein the coated iron particle has a thiol coating content of from about 1 wt % to about 10 wt % based on the total weight of the thiol coated iron particle, as determined by the difference in the weight of the particle before and after coating the particle.
5. The coated iron particle of claim 4, wherein the coated iron particle has a thiol coating content of from about 2 wt % to about 5 wt % based on the total weight of the thiol coated iron particle, as determined by the difference in the weight of the particle before and after coating the particle.
6. The coated iron particle of claim 1, wherein the coated iron particle has a ratio of $\chi_s$ to particle diameter of from about 0.5:1 to about 1.5:1.
7. The coated iron particle of claim 1, wherein the coated iron particle has a thiol coating content of from about 1 vol % to about 10 vol % based on the total volume of the thiol coated iron particle, as determined by the difference in the weight and density of the particle before and after coating the particle.
8. The coated iron particle of claim 1, wherein the thiol coating comprises, or is the reaction product of, a thiol compound selected from the group consisting of a heterocyclic thiol, a disulfide compound, a thiolate compound, and an alkyl polythiol.
9. The coated iron particle of claim 1, wherein the thiol coating comprises, or is the reaction product of, an alkyl polythiol selected from the group consisting of ethane dithiol, propane dithiol, butane dithiol, pentane dithiol, hexane dithiol, octane dithiol, nonane dithiol, and decane dithiol.
10. The coated iron particle of claim 1, wherein the thiol coating comprises, or is the reaction product of, a heterocyclic thiol that is 2,5-dimercapto-1,3,4-thiadiazole.
11. A coated iron particle, or reaction product thereof, comprising:
    an iron particle having a diameter of from about 0.5 micron to about 1,000 microns; and
    a thiol coating disposed on the iron particle, wherein:
    the thiol coating has a thickness of from about 10 Angstroms to about 1,000 Angstroms, and
    the coated iron particle has a thiol coating content of from about 1 vol % to about 10 vol % based on the total volume of the thiol coated iron particle, as determined by the difference in the weight and density of the particle before and after coating the particle.
12. The coated iron particle of claim 11, wherein the thiol coating comprises, or is the reaction product of, a thiol compound selected from the group consisting of a heterocyclic thiol, a disulfide compound, a thiolate compound, and an alkyl polythiol.
13. The coated iron particle of claim 11, wherein the thiol coating comprises, or is the reaction product of, an alkyl polythiol selected from the group consisting of ethane dithiol, propane dithiol, butane dithiol, pentane dithiol, hexane dithiol, octane dithiol, nonane dithiol, and decane dithiol.
14. The coated iron particle of claim 11, wherein the thiol coating comprises, or is the reaction product of, a heterocyclic thiol that is 2,5-dimercapto-1,3,4-thiadiazole.
15. A coated iron particle, or reaction product thereof, comprising:
    an iron particle having a diameter of from about 0.5 micron to about 1,000 microns; and
    a thiol coating disposed on the iron particle, wherein the thiol coating comprises, or is the reaction product of, an alkyl polythiol selected from the group consisting of ethane dithiol, propane dithiol, butane dithiol, pentane dithiol, hexane dithiol, octane dithiol, nonane dithiol, and decane dithiol.

16. A coated iron particle, or reaction product thereof, comprising:
an iron particle having a diameter of from about 0.5 micron to about 1,000 microns; and
a thiol coating disposed on the iron particle,
wherein the thiol coating comprises, or is the reaction product of, a heterocyclic thiol that is 2,5-dimercapto-1,3,4-thiadiazole.

17. A composition, or reaction product thereof, comprising:
the coated iron particle of claim 1; and
a polymer or an adhesion promoter.

18. The composition of claim 17, wherein the composition comprises a polymer selected from the group consisting of an epoxy, a bismaleimide, a polyimide, a polyaryletherketone, a sol-gel, a polyurethane, a silicone, and a magneto rheological particle fluid.

19. A component comprising a surface and the composition of claim 17 disposed on the surface.

20. A composition, or reaction product thereof, comprising:
a polymer or an adhesion promoter; and
a coated iron particle, or reaction product thereof, the coated iron particle comprising:
an iron particle having a diameter of from about 0.5 micron to about 1,000 microns; and
a thiol coating disposed on the iron particle,
wherein the composition comprises a polymer selected from the group consisting of an epoxy, a bismaleimide, a polyimide, a polyaryletherketone, a sol-gel, a polyurethane, a silicone, and a magneto rheological particle fluid,
wherein the composition has a coated iron particle content of from about 0.5 wt % to about 10 wt %.

21. A method for passivating an iron particle comprising:
introducing a passivation agent having one or more sulfur moieties into a solvent to form a passivation solution; and
contacting an iron particle having a diameter of from about 0.5 micron to about 1,000 microns with the passivation solution to form a coated iron particle,
wherein introducing a passivation agent into a solvent comprises introducing the passivation agent into a solvent selected from the group consisting of an alcohol, an alkylcarbonate, an ether, a glycol ether, tetrahydrofuran, N-methyl-2-pyrrolidone, dimethyl sulfoxide, and mixtures thereof,
wherein a concentration of the passivation agent in the passivation solution is from about 1 M to about 2 M.

22. The method of claim 21, further comprising filtering the coated iron particle and drying the coated iron particle by curing the coated iron particle at a temperature of from about 30° C. to about 70° C.

23. A method for passivating an iron particle comprising:
introducing a passivation agent having one or more sulfur moieties into a solvent to form a passivation solution; and
contacting an iron particle having a diameter of from about 0.5 micron to about 1,000 microns with the passivation solution to form a coated iron particle,
wherein the passivation agent is selected from the group consisting of a heterocyclic thiol, a disulfide compound, a thiolate compound, and an alkyl polythiol.

24. The method of claim 23, wherein contacting the iron particle with the passivation solution comprises introducing the iron particle to the passivation solution to form a solution comprising the passivation agent and the iron particle.

25. The method of claim 24, further comprising stirring the solution comprising the passivation agent and the iron particle.

26. The method of claim 25, further comprising heating the passivation solution to a temperature of from about 40° C. to about 80° C. before introducing the iron particle to the passivation solution.

27. A method for passivating an iron particle comprising:
introducing an iron particle having a diameter of from about 0.5 micron to about 1,000 microns into a solvent to form an iron particle solution;
contacting a passivation agent having one or more sulfur moieties with the iron particle solution to form a coated iron particle; and
heating the iron particle solution to a temperature of from about 40° C. to about 80° C.;
wherein introducing comprises introducing the iron particle into a solvent selected from the group consisting of an alcohol, an alkylcarbonate, an ether, a glycol ether, tetrahydrofuran, N-methyl-2-pyrrolidone, dimethyl sulfoxide, and mixtures thereof,
wherein contacting the passivation agent with the iron particle solution comprises introducing the passivation agent to the iron particle solution to form a solution comprising the passivation agent and the iron particle.

28. The method of claim 27, further comprising filtering the coated iron particle and drying the coated iron particle by curing the coated iron particle at a temperature of from about 30° C. to about 70° C.

* * * * *